United States Patent [19]
Krysiak

[11] 3,792,749
[45] Feb. 19, 1974

[54] PORTABLE, CRASH-EMERGENCY GROUND EFFECTS SKIRT

[76] Inventor: Joseph E. Krysiak, 8990 Billings Rd., Willoughby, Ohio 44094

[22] Filed: May 23, 1972

[21] Appl. No.: 256,066

[52] U.S. Cl. .............................................. 180/127
[51] Int. Cl. .............................................. B60v 1/16
[58] Field of Search ... 180/127, 128, 116, 118, 119, 180/120; 104/23 FS; 114/67 A; 244/12 R

[56] References Cited
UNITED STATES PATENTS

| 3,726,493 | 4/1973 | Muller | 244/2 |
| 3,520,381 | 7/1970 | Pinder | 180/127 |
| 3,327,797 | 6/1967 | Bertin | 180/127 |

Primary Examiner—Stanley H. Tollberg
Assistant Examiner—James M. Slattery

[57] ABSTRACT

A portable, ground effects skirt adapted to be wrapped around the fuselage of a crashed aircraft and consisting of a plurality of releasably interconnected skirt sections having an enlarged top seam with a series of spaced-apart openings engaged with, and supported in depending relation from, a plurality of bolts previously attached at designated spots along the fuselage of the aircraft. Sealing means disposed along the top seam are held in air-tight relation with the fuselage when the skirt is assembled thereto, and air inlet means provide for the admission of compressed air between the fuselage and skirt in a downward direction to thereby form an air cushion with the ground.

5 Claims, 8 Drawing Figures

PATENTED FEB 19 1974 3,792,749
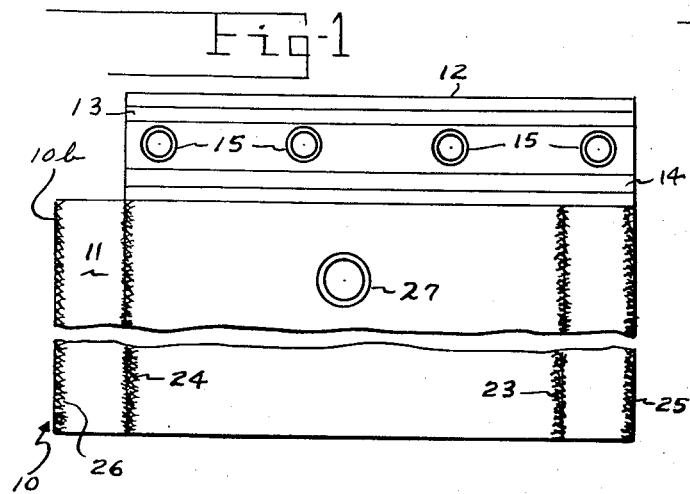
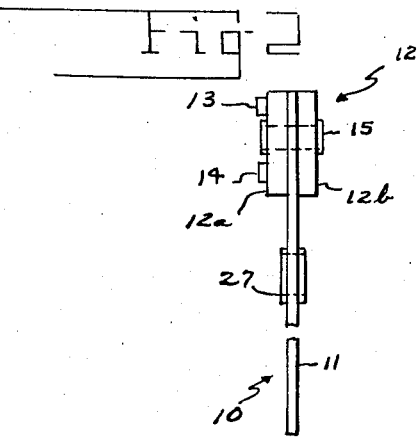
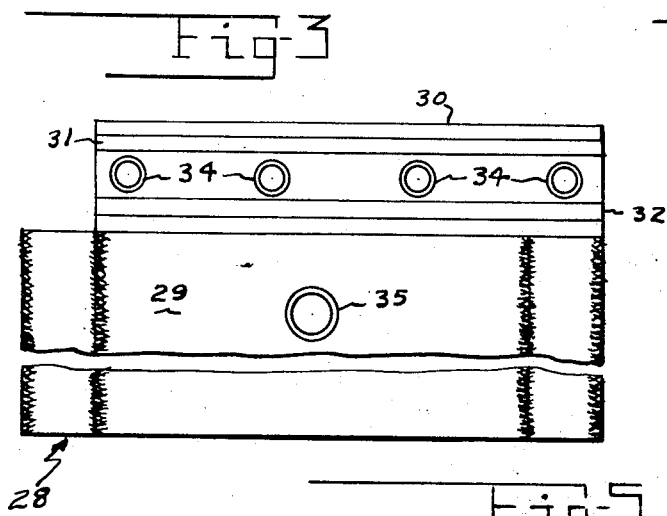
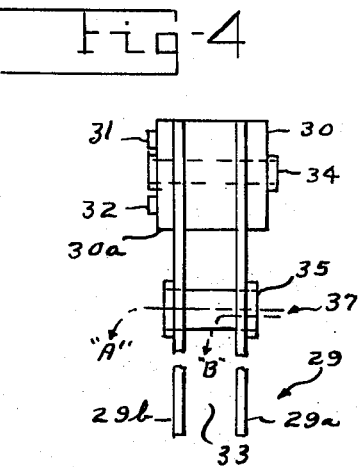
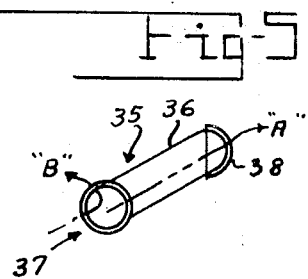
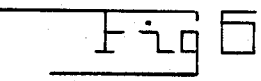
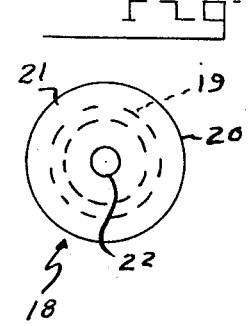
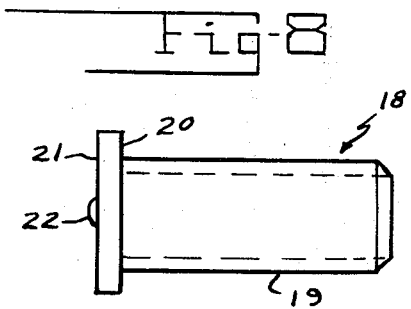

3,792,749

PORTABLE, CRASH-EMERGENCY GROUND EFFECTS SKIRT

BACKGROUND OF THE INVENTION

This invention relates generally to the field of ground effects technology or air cushion machines and, in particular, to ground effects skirts.

In removing crashed aircraft from runways or other ground sites, it has been the general practice, heretofore, to use relatively large vehicles, such as bulldozers, tractors, trucks, or other wheeled or tracked vehicles. Obviously, such vehicles are rather cumbersome and slow, and also may cause damage to the aircraft during its removal. Nevertheless, it is imperative that the aircraft be removed as soon as possible, particularly when an active runway is involved in a combat zone. Other reasons for such rapid removal include that of security, and to enable a proper accident investigation to be made at a more suitable location for the examination of the various parts and instruments of the crashed aircraft. In the case of very large aircraft, such as the C–131 or the C–5A, or when the aircraft has crashed in a swamp or other relatively inaccessible area, or when the crash has occurred at, or near a base in which there are no vehicles capable of towing or pushing the particular aircraft involved, then, unfortunately, the aircraft must be dynamited into smaller sections that are more easily removed.

In an effort to eliminate or, at least, substantially alleviate the above-noted problem and considerable expense involved, as well as to provide a much improved and more rapid removal of crashed aircraft in general from both relatively inaccessible and very accessible ground sites, research has been conducted in the field of ground effects technology. As a consequence thereof, it has been determined to be feasible to use a ground effects skirt attached to the fuselage of the crashed aircraft for its removal from the crash site on an air cushion created by the skirt with the ground.

Previously-designed skirts of the type referred to hereinabove have included as a representative example thereof a detachable skirt, as disclosed in U. S. Pat. No. 3,327,797, that is removably mounted to a ground effects or air cushion machine-platform by means of an angle member affixed to the bottom of the platform. In another U. S. Pat., No. 3,511,331, there is taught the use of a number of skirts that have been formed into different shapes and which are comprised of several panels interconnected by an elastic-type joint. In still another previously-disclosed skirt shown in British Pat. No. 1,214,996, an oil-storage tank is supported on an air cushion formed by a flexible skirt. However, the latter is illustrated as actually being interconnected with, and supported to the tank by an intermediately-positioned, inflatable tube that is affixed to the tank by a plurality of studs screw-threaded into the tank.

A further development in the present field of ground effects technology involved the testing of an aircraft model in which the periphery of the fuselage, including the bottom thereof, was completely wrapped in a single flexible skirt that was taped to the fuselage at its opposite side edges. The bottom of this skirt was equipped with drawstrings attached crosswise from one side of the skirt to the other. Tabs attached thereto were used to draw up the drawstrings in a snug-fit relation and form a partial toroidal cross-section skirt portion that would be inflated to form the required air cushion. Although this device appeared to be successful with a model, its application generally to a full-sized aircraft and, in particular, to extremely large aircraft such as the C–131 or the C–5A would appear not to be feasible. For one thing, it is readily apparent that the mere use of tape only for attachment of its skirt, at the top edge thereof, to the aircraft fuselage would severely limit the load to which the said skirt would be capable of withstanding before its failure. Moreover, since this skirt is required to be completely wrapped around the bottom of the fuselage, the crashed aircraft would require the transport of some relatively large hoisting mechanism to the crash site, so that the aircraft could be initially raised off the runway or other ground site prior to the application of the skirt thereto. Furthermore, since only a single skirt would be utilized, the stockpiling of a separate skirt for each different sized aircraft would be required.

The skirts disclosed in both of the aforementioned U. S. Pat. Nos. 3,327,797 and 3,511,331 would also, as in the case of the British Pat. No. 1,214,996 skirt, require that the crashed aircraft be initially raised before the said skirts could be attached to the aircraft fuselage. In addition, although the skirt of U.S. Pat. No. 3,511,331 is depicted as being constructed of at least two sheets interconnected by an elastomeric joint, the said skirt is actually formed into a truncated cone and the elastomeric joint is used to provide for the application of a kind of spring action which returns the skirt to its original position after an obstacle has been traversed on the ground. In other words, the use of two or more sheets with an elastic joint does not provide for the assembly of this skirt to the fuselage of an aircraft of various sizes. On the other hand, the new and improved ground effects skirt of the present invention, to be hereinafter described in the following summary and detailed description, uniquely and specifically provides both for the positive attachment of the inventive skirt to the fuselage of the aircraft, without, however, damaging such fuselage, and, at the same time, is specifically designed to accommodate aircraft fuselages of various sizes and shapes without requiring any substantial modification thereof.

SUMMARY OF THE INVENTION

The present invention resides briefly in a portable-type of ground effects skirt for use in the emergency removal of a crashed aircraft. Said skirt consists of a series of individual, substantially rectangular, skirt sections releasably interconnected by quick-release means to form an overall skirt capable of fitting aircraft fuselages of various sizes. The quick release means may consist either of a zipper device, or a Velcro fastener. Each skirt section may be comprised of a heavy duty canvas duck material and further incorporate a relatively enlarged, elastic seam along the top edge surface thereof. The elastic seam may be formed with a series of spaced-apart openings and oppositely-disposed sealing means incorporated on the seam along opposite sides of the openings to thereby prevent air leakage out of the top of the skirt and between the skirt and the fuselage when in their assembled condition. A series of skirt-mounting bolts, mountable in a substantially flat and sealed relation to the face of the aircraft fuselage by improved means to be further described in specific connection with FIGS. 6, 7 and 8, are engageable within the top seam-openings of each skirt section to thereby suspend the overall skirt so formed in depending relation to the aircraft fuselage, with the sealing means being thereby compressed into an air-tight relation with the fuselage. Air inlet means, formed in one of the interconnected skirt sections, is adapted to provide for the admission of compressed air between the skirt and fuselage, which compressed air would be positively directed donwnwardly to thereby form an air cushion with the ground, because of the air-tight, or substantially air-tight relation existing between the sealing means at the top surface of the skirt and the fuselage.

Inherent objects and advantages of the invention will become self-evident hereinafter in connection with the following disclosure, taken in connection with the accompanying drawings, in which:

BRIEF DESCRIPTION OF THE DRAWINGS

FIGS. 1 and 2 respectively represent partly broken-away, front and side views of an improved single-walled form of one of the plurality of interconnected skirt sections comprising the overall new and improved portable, crash emergency skirt of the present invention;

FIGS. 3 and 4 respectively represent additional partly broken-away, front and side views of a further improved double-walled form of the skirt section of FIGS. 1 and 2;

FIG. 5 is a fragmentary view, illustrating certain details of a modified form of air inlet or air hose connection-fitting used with one of the plurality of skirt sections of the invention to provide for the simultaneous admission of compressed air between the walls of the double-walled form of the invention, as disclosed in FIGS. 3 and 4, and in the skirted area between the skirt and the aircraft fuselage;

FIG. 6 is a schematic view, in side elevation, of a section of an aircraft fuselage, along which a series of spaced-apart spots have been inscribed at regular intervals to thereby mark the exact locations at which the skirt-mounting bolts used to hang the inventive skirt to the aircraft fuselage are affixed; and, FIGS. 7 and 8 respectively represent rear end and side views of the improved type of skirt-hanging bolt device used to hang the inventive skirt to the aircraft fuselage.

DESCRIPTION OF THE PREFERRED EMBODIMENT

Referring generally to the drawings and, in particular, to FIGS. 1 and 2 thereof, a basic, single-walled form of one of a plurality of identical and interconnected ground effects or air cushion-machine skirt sections constituting the present invention is indicated generally at 10. It is to be understood that the actual number of such relatively small, more easily handled skirt sections comprising the overall skirt structure depends naturally, on the size of the crashed aircraft to be removed. Said skirt section 10, which is substantially rectangular in shape, comprises a main skirt-body portion 11 that is preferably constructed from a heavy duty canvas duck material, and a relatively thick or enlarged and heavy, rubber seam 12 that is disposed along the top surface, or upper lengthwise side of the skirt-body portion 11 in resilient contact with the fuselage of the crashed aircraft when it is assembled thereto. The rubber material of the seam 12 is made sufficiently flexible to be easily conformable with, and thus accommodate, the surface of the fuselage against which it is mounted. In addition, the seam 12 uniquely incorporates a series of openings 15 centrally disposed along the lengthwise dimension thereof, and a pair of relatively elongated and parallel-extending seals, at 13 and 14, that are likewise disposed along the length of said seam 12 on opposite sides of the openings 15. As is clearly visible in FIG. 2, the seam 12 is formed with flat, opposite side surfaces, at 12a and 12b, and the aforementioned seals 13 and 14, which may be of either circular or rectangular cross-section, are incorporated in upstanding relation on the seam surface 12a, the said surface 12a constituting the rearmost surface that faces and contacts the side of the aircraft fuselage when assembled thereto. Thus, the aforesaid seals 13 and 14 extend further inwardly or rearwardly towards the surface of the aircraft fuselage.

The above-mentioned openings 15 are preferably metal grommeted and extend completely through the seam 12 at equal intervals between the seals 13 and 14. The said metal grommeted openings 15 specifically allow and provide for each of the inventive skirt sections, as at 10, to be positively hung or supported in depending relation along its top surface from the fuselage of a crashed aircraft to thereby ensure a substantially floating-type removal of the said aircraft from a crashed position on a runway or other crash site. For this express purpose, the crashed aircraft fuselage, a preresentative section of which being schematically and generally depicted at 16 in FIG. 6, may be quickly and easily premarked with a plurality of bolt-mounting spots, disposed at predetermined and regular intervals therealong, as is generally indicated at 17. Thereafter, a new and improved bolt, indicated generally at 18 in FIGS. 7 and 8, may be affixed to each of the previously-marked spots 17. The bolt 18 is unique and constitutes an important and key feature of the present invention, since it is actually rigidly fixed in position to each of the spots 16 in a new and improved manner to be hereinafter described in detail.

Referring particularly to the aforementioned FIGS. 7 and 8, it is clearly seen that the previously-referred to bolt 18 includes a relatively elongated bolt shaft portion 19 and an enlarged bolt head portion 20. Uniquely incorporated in centrally-disposed relation on the face 21 of the said bolt head portion 20 is a perle or, in other words, a relatively small gelatinous capsule 22 that contains a measured or predetermined amount of a relatively quick-setting epoxy resin material. With this novel arrangement, by applying a sufficient pressure to the bolt 18 so that its bolt face 21 is squeezed against the aircraft fuselage 16 and between the said fuselage 16 and the bolt face 21, or, in other words, when the bolt face 21 is jammed against the fuselage 16 at a preselected marked spot 17, the perle or capsule 22 will naturally rupture, and the epoxy resin contained therewithin will spread outwardly to cover the bolt face-fuselage interface. After only a few seconds of continuous pressure, the epoxy resin will quickly set and harden so that the bolt 18 will then be firmly attached to the fuselage 16. Of course, a separate bolt is thus applied to each spot 16 and will thereby support its share of the total load being applied to the aircraft fuselage by the application of the inventive ground effects skirt thereto.

As previously noted, a plurality of the inventive skirt sections, as at 10, would be interconnected in a sufficient number into an overall ground effects skirt that would be long enough to accommodate the particular size of the fuselage of the specific crashed aircraft. To specifically provide for the relatively easy and quick assembly and/or disassembly of the inventive ground effects skirt, with respect to an aircraft fuselage, each of the skrit sections, as at 10 (Note FIG. 1, for example), is specifically designed with a quick release or attachment means that could include, for example, a first pair of zippers, indicated at 23 and 24 and which are respectively disposed on the front and rear sides of the skirt-body portion 11 at a position inwardly of the opposite width edges thereof, and, in addition, a second pair of zippers, indicated at 25 and 26 and which are respectively disposed in opposed manner to the zippers 23 and 24 on the rear and front sides of the said skirt-body portion 11, exactly at the opposite width edges thereof. Thus, the zippers 23 and 24, and 25 and 26 of a pair of adjacently-positioned identical skirt sections would respectively releasably engage with each other to thereby facilitate the interconnection of the requisite number of skirt sections, as at 10, into the new and improved ground effects skirt of the present invention. Of course, this interconnection of adjacent skirt sections would be effected by overlapping the extended width portion, as at 10b (FIG. 1), on the left-hand side of one skirt section, as at 10, so that it is placed in proper position over, and relative to the right-hand side portion of the next preceeding skirt section to thereby engage or connect the respective zippers thereof. Velcro fasteners could also be used for this purpose as an alternative to the previously-described zippers.

After interconnecting the necessary number of skirt sections 10 to form the overall ground effects skirt of the present improvement and, in proper sequence installing each of the said skirt sections on the previously-mounted bolts, as at 18, compressed air may then be introduced into the skirted area between the depending side walls of the inventive skirt and the aircraft fuselage, and will thereafter be directed downwardly for contact and to form an air cushion with the runway or other ground site. This air cushion is preserved and held trapped within the skirted area, since, at this time, the previously-described seals 13 and 14 have been resiliently pressed into an air-tight relation with the side of the aircraft fuselage, as at 16 (FIG. 6), by virtue of the installation of the various interconnected skirt sections, as at 10, on the series of bolts, as at 18, fixed in regularly spaced relation to the aircraft fuselage. Naturally, the final assembly thereof would reuiqre the use of a nut (not shown) on each bolt. Moreover, the individual skirt sections, as at 10, are uniquely interconnected in overlapping manner, as described hereinbefore, which overlapping arrangement makes the inventive skirt sufficiently air-tight at its jointure with the aircraft fuselage to all but prevent air from leaking out of any of the top surface portions thereof. The aforementioned admission of compressed air is made through a grommeted opening, or air hose fitting, at 27, which may be centrally disposed and formed in the body-portion 11 of the skirt section 10 (Note FIGS. 1 and 2). Only one such compressed air inlet means formed in a single skirt section is required. The supply of pressurized air may come from any appropriate externally-provided air generating mechanism that is not illustrated, since the specific nature thereof is unimportant to the present invention.

Referring particularly to FIGS. 3 and 4, a further improved double-walled form of the inventive skirt section is depicted generally at the reference numeral 28 as, again, including a skirt body-portion at 29, and a relatively enlarged, heavy, rubber top surface-seam portion at 30 that is flexible enough to allow the skirt to follow the shape and external contour of the aircraft fuselage to which it is to be mounted. As in the case of the single-walled version of FIGS. 1 and 2, a pair of elastic seals 31 and 32 (Note particularly FIG. 4) have been incorporated on the flat inner or rear surface 30a of the seam 30 for resilient and compressed, air-tight engagement with the aircraft fuselage after the skirt section 28, and the other skirt sections releasably interconnected therewith, have been mounted in depending relation, as described before, to the aircraft fuselage.

As is particularly illustrated in the aforementioned FIG. 4, the body portion 29 of the skirt section 28 consists of a double-walled configuration that includes front and rear wall-skirt portions, indicated at 29a and 29b, respectively, which are spaced-apart from each other, as shown, to provide an additional space 33 therebetween, which space 33 is closed in an air-tight relation at its top by the said heavy rubber seam 30, and is opened at its bottom to thereby form an additional air cushion means with the runway or other crash site. The aforementioned top surface seam portion 30 also incorporates a series of regularly-spaced grommeted openings at 34 having the same, mounting function as for the openings 15 in the single-walled skirt section 10 of FIGS. 1 and 2.

With either the above-described single- or double-walled forms of the inventive ground effects skirt, the air cushion formed thereby provides for the relatively easy and quick removal, as by pushing or pulling, of the crashed aircraft to another, more suitable inspection area, by whatever rolling stock that may be locally avialable. The double-walled form of the inventive skirt section of FIGS. 3 and 4 ensures greater stability to the aircraft during its movement. However, with the use of the said double-walled skirt section 28, a modified air inlet grommeted opening and/or air hose connection is required in order to provide both a flow of compressed air into, the interior, skirted area between the inventive skirt and the fuselage, and within the previously-described walled area or space 33 between the front and rear wall-skirt portions 29a and 29b (See FIG. 4). Said modified air hose connection is indicated generally at 35 in FIG. 5 as consisting of, and incorporating a split hole fitting that is formed by the flat, and relatively elongated intermediately-disposed wall surface, at 36. The latter acts to split or divide compressed air being introduced, at the inelt opening 37 by the previously-referred, externally-provided air generating mechanism (not shown) into two flow paths. One of the latter is formed by a first, relatively long, air flow passage disposed on one side of the wall surface 36 and represented by the length and direction of the arrow marked A. As is clearly seen in the aforementioned FIG. 5, and in FIG. 4, a portion of the air introduced at the inlet opening 37 is directed completely through the kirt section 28 in the direction of the arrow A through the said relatively long passage denoted thereby for its feeding into the interior or inide of the skirted area to thereby provide the main air cushion for the crashed aircraft. A second portion of the incoming compressed air being admitted at the inlet opening 37 is divided, by the said wall surface 36, into a second, air flow passage that extends or is led directly from the said inlet openings 37, as is denoted by the length and direction of the arrow marked B, into the space 33 formed within and by the double-walled skirt section 28. Of course, to ensure the dividing of the incoming air into the required two separate flow paths, the air inlet opening 37 is specifically designated, as is clearly visible in FIG. 5, to be a circular-type of opening that is in open communication with both flow paths, whereas, on the other hand, the exit opening at 38 is made hemispherical in configuration and is in opening communication only with its first flow path formed by the relatively long passage indicated by the arrow A. With this unique double-walled ground effects skirt, an auxiliary air cushion is formed within the space 33, which space 33 is of course positioned further outwardly of the main, air cushion and aircraft fuselage, and therefore acts as a simple and yet novel stabilizing means to the aircraft during its movement on the main air cushion.

I claim:

1. A crash emergency-ground effects skirt for facilitating the removal of a crashed or disabled aircraft from a runway or other ground site by means of the formation of an air cushion; said skirt comprising; a plurality of relatively small, portable and individual skirt sections assembled into a unified ground effects skirt suspended, at its top surface, from, and supported to the periphery of the fuselage of the crashed or disabled aircraft and extending downwardly to an open bottom surface in close proximity to the ground surface, each of said skirt sections including a main, skirt portion adapted to collectively enclose and form an air cushion, in concert with the remaining skirt sections, on the introduction of a continuous supply of compressed air or other gas thereinto, and a relatively enlarged top surface-seam portion engageable against the periphery and being of an elastic configuration conformable with, and thereby precisely accommodatng the curvature of and thus positively sealing in air-tight relation against the aircraft fuselage on its assembly thereto; first, means for releasably attaching the said top surface-seam portion of said ground effects skirt in the said positive sealing and air-tight relation to the periphery of the aircraft fuselage; and second, combined quick-release and air tight-sealing means interconnected between and disposed entirely along overlapping and mating side portions extending completely from the said top surface-seam portion to the bottom surface of said main, skirt portion of each of an adjacently-positioned pair of said plurality of skirt sections; said last-named means having built-in manual and quick-adjustment means operative between open and closed positions to thereby facilitate both the assembly and disassembly thereof, and the positive and complete sealing in air-tight relation of each of the said overlapping and mating side portions provided between each pair of skirt sections.

2. A crash emergency-ground effects skirt as in claim 1, the built-in manual and quick adjustment means of said second, combined quick-release and air tight-sealing means comprising oppositely-disposed pair of zippers incorporated on the said overlapping and mating side portions of each of said skirt sections.

3. A crash emergency-ground effects skirt as in claim 1, wherein the built-in manual and quick-adjustment means of said second, combined quick-release and air tight-sealing means comprises Velcro fasteners positioned in respective complementary and engaged relation along the said overlapping and mating side portions of said skirt sections.

4. A crash emergency-ground effects skirt as in claim 1, said first releasable attaching means between said top surface-seam portion and said aircraft fuselage comprising; a series of openings incorporated in lengthwise disposition along the said seam portion; and a plurality of bolts attached in regularly-spaced intervals along the periphery of the fuselage and respectively engageable within said series of openings.

5. A crash emergency-ground effects skirt as in claim 4, wherein said top surface-seam portion further incorporates sealing means disposed therealong in a lengthwise direction and maintained in an air-tight sealing relation with the periphery of the aircraft fuselage when said plurality of skirt sections have been assembled thereto by said first releasable attaching means.

* * * * *